US012562407B2

(12) United States Patent
Zhao et al.

(10) Patent No.: US 12,562,407 B2
(45) Date of Patent: Feb. 24, 2026

(54) METHOD AND SYSTEM FOR PERIODIC DEEP DISCHARGE TO EXTRACT LITHIUM IN SILICON-DOMINANT ANODES

(71) Applicant: Enevate Corporation, Irvine, CA (US)

(72) Inventors: Hong Zhao, Irvine, CA (US);
Benjamin Park, Irvine, CA (US)

(73) Assignee: ENEVATE CORPORATION, Irvine, CA (US)

( * ) Notice: Subject to any disclaimer, the term of this patent is extended or adjusted under 35 U.S.C. 154(b) by 221 days.

(21) Appl. No.: 17/231,788

(22) Filed: Apr. 15, 2021

(65) Prior Publication Data

US 2022/0336871 A1 Oct. 20, 2022

(51) Int. Cl.
| | |
|---|---|
| *H01M 10/44* | (2006.01) |
| *H01M 4/38* | (2006.01) |
| *H01M 10/0525* | (2010.01) |
| *H01M 4/02* | (2006.01) |
| *H02J 7/00* | (2006.01) |

(52) U.S. Cl.
CPC .......... *H01M 10/44* (2013.01); *H01M 4/386* (2013.01); *H01M 10/0525* (2013.01); *H01M 2004/027* (2013.01); *H02J 7/0068* (2013.01)

(58) Field of Classification Search
CPC .............................. H01M 10/44; H02J 7/0069
See application file for complete search history.

(56) References Cited

U.S. PATENT DOCUMENTS

| | | | |
|---|---|---|---|
| 2005/0127875 A1* | 6/2005 | Hall | H01M 10/44 320/131 |
| 2011/0236751 A1* | 9/2011 | Amiruddin | H01M 4/505 429/188 |
| 2015/0091530 A1* | 4/2015 | Zhang | H01M 10/0525 320/128 |
| 2015/0367747 A1* | 12/2015 | Decker | B60L 58/21 320/136 |
| 2016/0105054 A1* | 4/2016 | Horito | H01M 10/4257 320/134 |

OTHER PUBLICATIONS

International Search Report and Written Opinion for PCT/US2022/021756, mailed Apr. 15, 2022, 6 pages.

* cited by examiner

*Primary Examiner* — Nathanael T Zemui
(74) *Attorney, Agent, or Firm* — McAndrews, Held & Malloy, Ltd.

(57) ABSTRACT

A method for periodic deep discharge to extract lithium in silicon-dominant anodes may include providing a cell comprising a cathode, a separator, and a silicon-dominant anode; charging and discharging the cell through a plurality of cycles; and, following the plurality of cycles, performing one or more deep discharge cycles, where each of the one or more deep discharge cycles comprises a cutoff voltage below a normal operating voltage range of the cell. The one or more deep discharge cycles may comprise a C/10 or lower or C/20 or lower discharge current. The one or more deep discharge cycles may include a cutoff voltage of 3.2 V or less, a cutoff voltage of 2.5 V or less, a cutoff voltage of 1.5 V or less, or a cutoff voltage of 1 V or less. The cell may be configured at a higher temperature during the one or more deep discharge cycles.

27 Claims, 9 Drawing Sheets

221 — Mix active material slurry

223 — Coat slurry on foil

225 — Dry solvent

227 — Optional Calendering

229 — Pyrolysis

231 — Punch, fabricate cell

233 — Formation and test

METHOD AND SYSTEM FOR PERIODIC DEEP DISCHARGE TO EXTRACT LITHIUM IN SILICON-DOMINANT ANODES

CROSS-REFERENCE TO RELATED APPLICATION/INCORPORATION BY REFERENCE

N/A

FIELD

Aspects of the present disclosure relate to energy generation and storage. More specifically, certain embodiments of the disclosure relate to a method and system for periodic deep discharge to extract lithium in silicon-dominant anodes.

BACKGROUND

Conventional approaches for battery configuration may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for periodic deep discharge to extract lithium in silicon-dominant anodes, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

Figure 1:
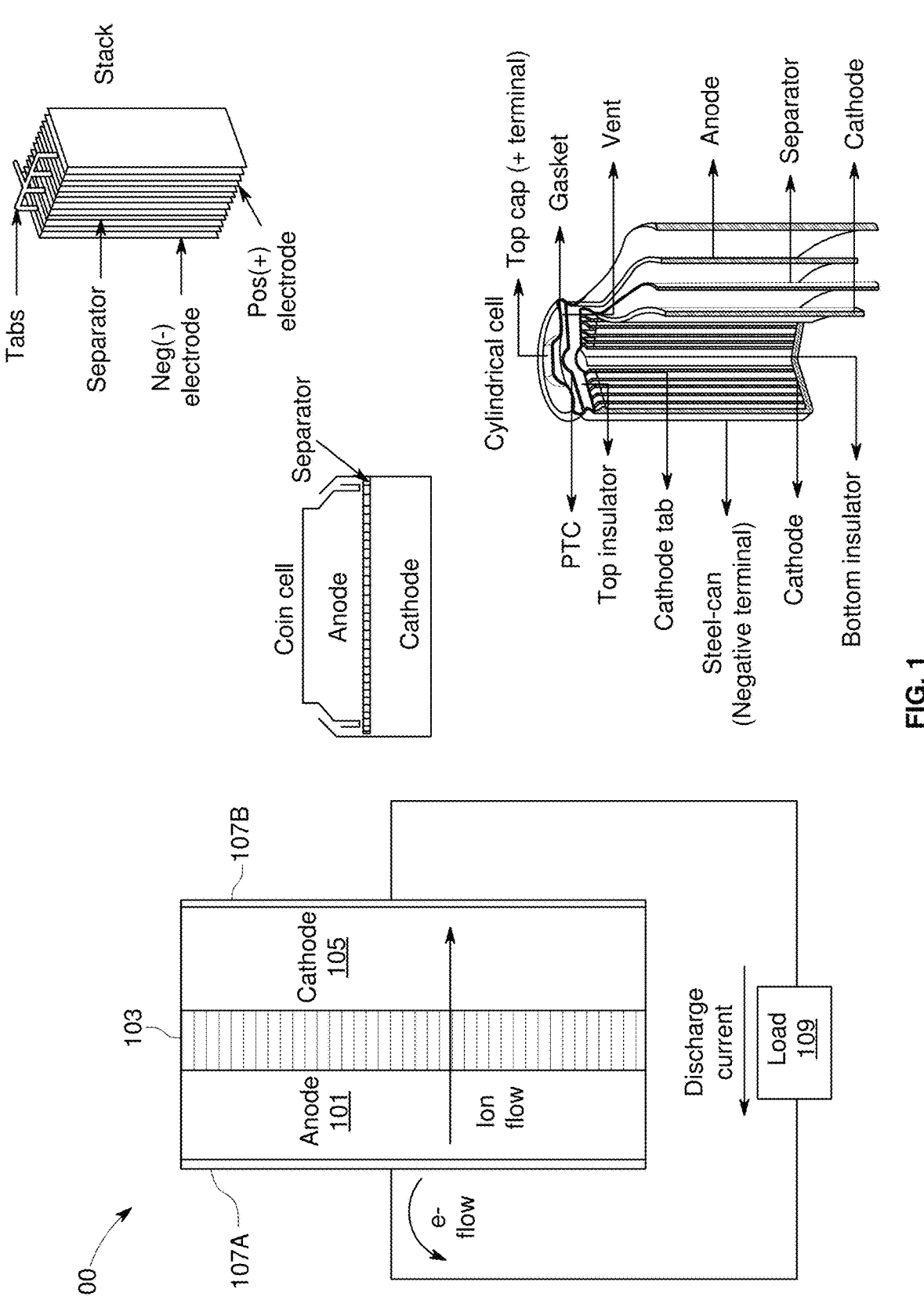
FIG. 1 is a diagram of a battery, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1 is a very simplified example merely to show the principle of operation of a lithium ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. In an example scenario, the electrolyte may comprise Lithium hexafluorophosphate ($LiPF_6$) and lithium bis(trifluoromethanesulfonyl)imide (LiTFSI) that may be used together in a variety of electrolyte solvents. Lithium hexafluorophosphate ($LiPF_6$) may be present at a concentration of about 0.1 to 2.0 molar (M) and lithium bis(trifluoromethanesulfonyl)imide (LiTFSI) may be present at a concentration of about 0 to 2.0 molar (M). Solvents may comprise one or more of ethylene carbonate (EC), fluoroethylene carbonate (FEC) and/or ethyl methyl carbonate (EMC) in various percentages. In some embodiments, the electrolyte solvents may comprise one or more of EC from about 0-40%, FEC from about 2-40% and/or EMC from about 50-70% by weight.

The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon or more by weight in the anode material on the current collector, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (4200 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

During normal cycling in various conditions/voltage windows, cells may lose capacity. Some of the capacity loss in Si-dominant cells may be due to lithium trapped deep inside the anode, such as deep inside each silicon particle, or deep inside pyrolytic carbon, for example. By doing a deep discharge, that part of capacity loss can be reversed and put back into the system. Thus, by doing a deep discharge periodically, cell capacity and cycle life may be improved. A deep discharge may comprise a cycle where the voltage at which discharge stops is lower than normal discharge cutoff. This is described further with respect to FIGS. 3-6.

Figure 2A:
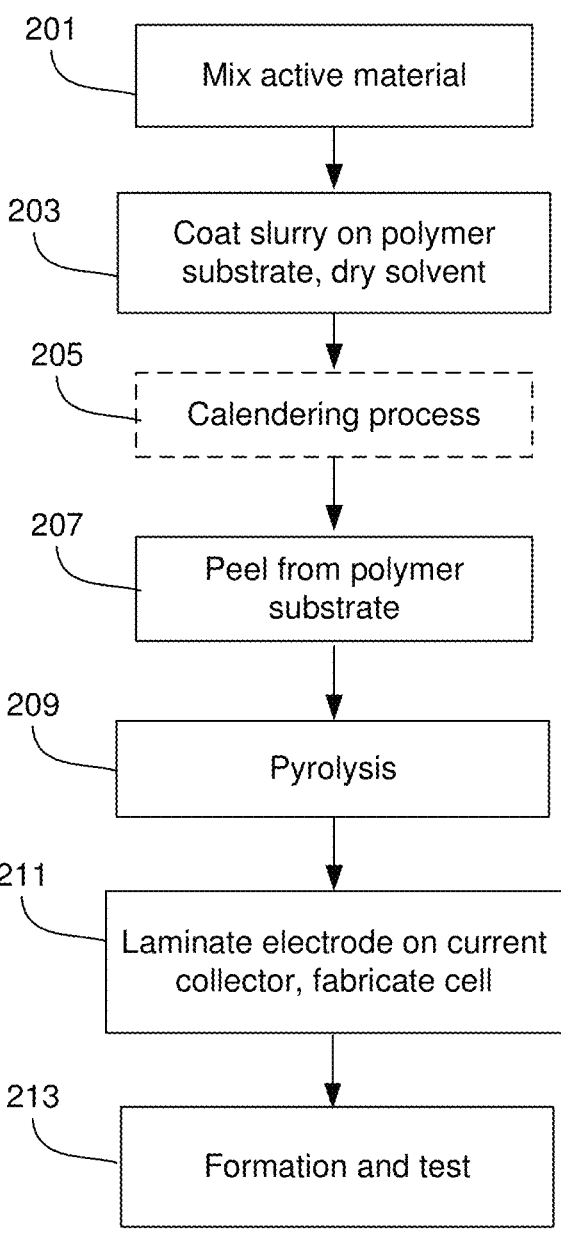
FIG. 2A is a flow diagram of a lamination process for forming a silicon-dominant anode cell, in accordance with an example embodiment of the disclosure.

FIG. 2A is a flow diagram of a lamination process for forming a silicon-dominant anode cell, in accordance with an example embodiment of the disclosure. This process employs a high-temperature pyrolysis process on a substrate, layer removal, and a lamination process to adhere the active material layer to a current collector.

The raw electrode active material is mixed in step 201. In the mixing process, the active material may be mixed, e.g., a binder/resin (such as PI, PAI), solvent, and conductive additives. The materials may comprise carbon nanotubes/fibers, graphene sheets, metal polymers, metals, semiconductors, and/or metal oxides, for example. Silicon powder with a 1-30 or 5-30 μm particle size, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

In step 203, the slurry may be coated on a substrate. In this step, the slurry may be coated onto a Polyester, polyethylene terephthalate (PET), or Mylar film at a loading of, e.g., 2-4 mg/cm$^2$ and then undergo drying to an anode coupon with high Si content and less than 15% residual solvent content. This may be followed by an optional calendering process in step 205, where a series of hard pressure rollers may be used to finish the film/substrate into a smoothed and denser sheet of material.

In step 207, the green film may then be removed from the PET, where the active material may be peeled off the polymer substrate, the peeling process being optional for a polypropylene (PP) substrate, since PP can leave ~2% char residue upon pyrolysis. The peeling may be followed by a pyrolysis step 209 where the material may be heated to 600-1250C for 1-3 hours, cut into sheets, and vacuum dried using a two-stage process (120° C. for 15 h, 220° C. for 5 h).

In step 211, the electrode material may be laminated on a current collector. For example, a 5-20 μm thick copper foil may be coated with polyamide-imide with a nominal loading of, e.g., 0.2-0.6 mg/cm$^2$ (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

In step 213, the cell may be assessed before being subject to a formation process. The measurements may comprise impedance values, open circuit voltage, and thickness measurements. During formation, the initial lithiation of the anode may be performed, followed by delithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in formation steps. During operation, the cell may be cycled through one or more deep discharges periodically to recover lithium that may have become deeply embedded in the anode active material.

Figure 2B:
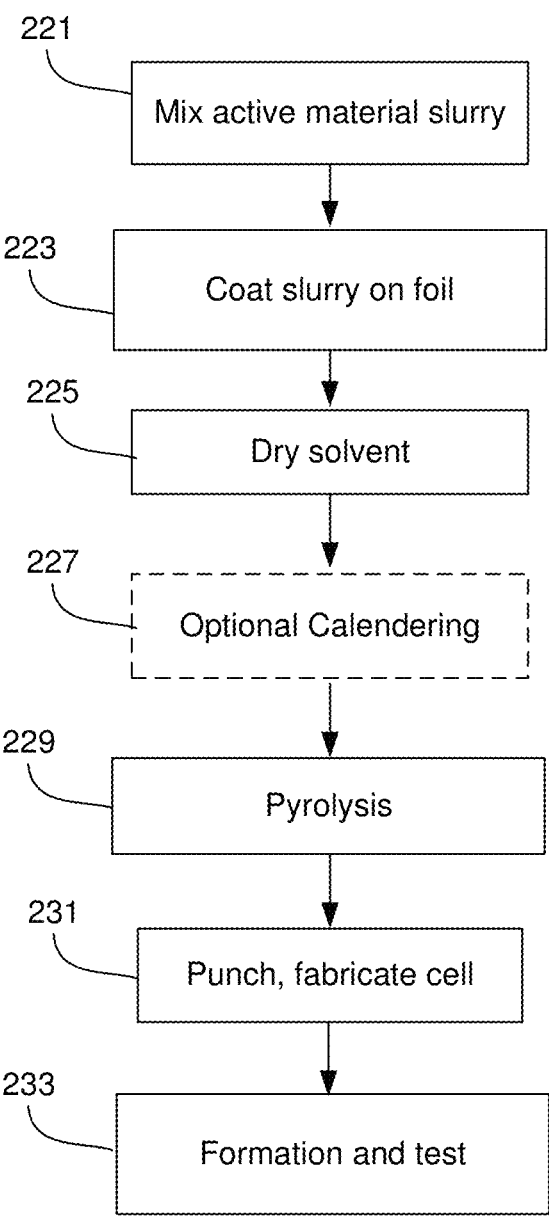
FIG. 2B is a flow diagram of a direct coating process for forming a silicon-dominant anode cell, in accordance with an example embodiment of the disclosure.

FIG. 2B is a flow diagram of a direct coating process for forming a silicon-dominant anode cell, in accordance with an example embodiment of the disclosure. This process comprises physically mixing the active material, conductive additive, and binder together, and coating it directly on a current collector before pyrolysis. This example process comprises a direct coating process in which an anode or cathode slurry is directly coated on a copper foil using a binder such as CMC, SBR, Sodium Alginate, PAI, PI and mixtures and combinations thereof.

In step 221, the active material may be mixed, e.g., a binder/resin (such as PI, PAI), solvent, and conductive additives. The materials may comprise carbon nanotubes/fibers, graphene sheets, metal polymers, metals, semiconductors, and/or metal oxides, for example. Silicon powder with a 5-30 μm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

Furthermore, cathode active materials may be mixed in step 221, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 223, the slurry may be coated on a copper foil. In the direct coating process described here, an anode slurry is coated on a current collector with residual solvent followed by a calendaring process for densification followed by pyrolysis (~500-800C) such that carbon precursors are partially or completely converted into glassy carbon. Similarly, cathode active materials may be coated on a foil material, such as aluminum, for example. The active material layer may undergo a drying in step 225 resulting in reduced residual solvent content. An optional calendering process may be utilized in step 227 where a series of hard pressure rollers may be used to finish the film/substrate into a smoother and denser sheet of material. In step 227, the foil and coating proceeds through a roll press for lamination.

In step 229, the active material may be pyrolyzed by heating to 500-1000° C. such that carbon precursors are partially or completely converted into glassy carbon. Pyrolysis can be done either in roll form or after punching. If done in roll form, the punching is done after the pyrolysis process. The pyrolysis step may result in an anode active material having silicon content greater than or equal to 50% by weight, where the anode has been subjected to heating at or above 400 degrees Celsius. In an example scenario, the anode active material layer may comprise 20 to 95% silicon and in yet another example scenario may comprise 50 to 95% silicon by weight. In instances where the current collector foil is not pre-punched/pre-perforated, the formed electrode may be perforated with a punching roller, for example. The punched electrodes may then be sandwiched with a separator and electrolyte to form a cell.

In step 233, the cell may be assessed before being subject to a formation process. The measurements may comprise impedance values, open circuit voltage, and thickness measurements. During formation, the initial lithiation of the anode may be performed, followed by delithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in formation steps. During operation, the cell may be cycled through one or more deep discharges periodically to recover lithium that may have become deeply embedded in the anode active material.

Figure 3:
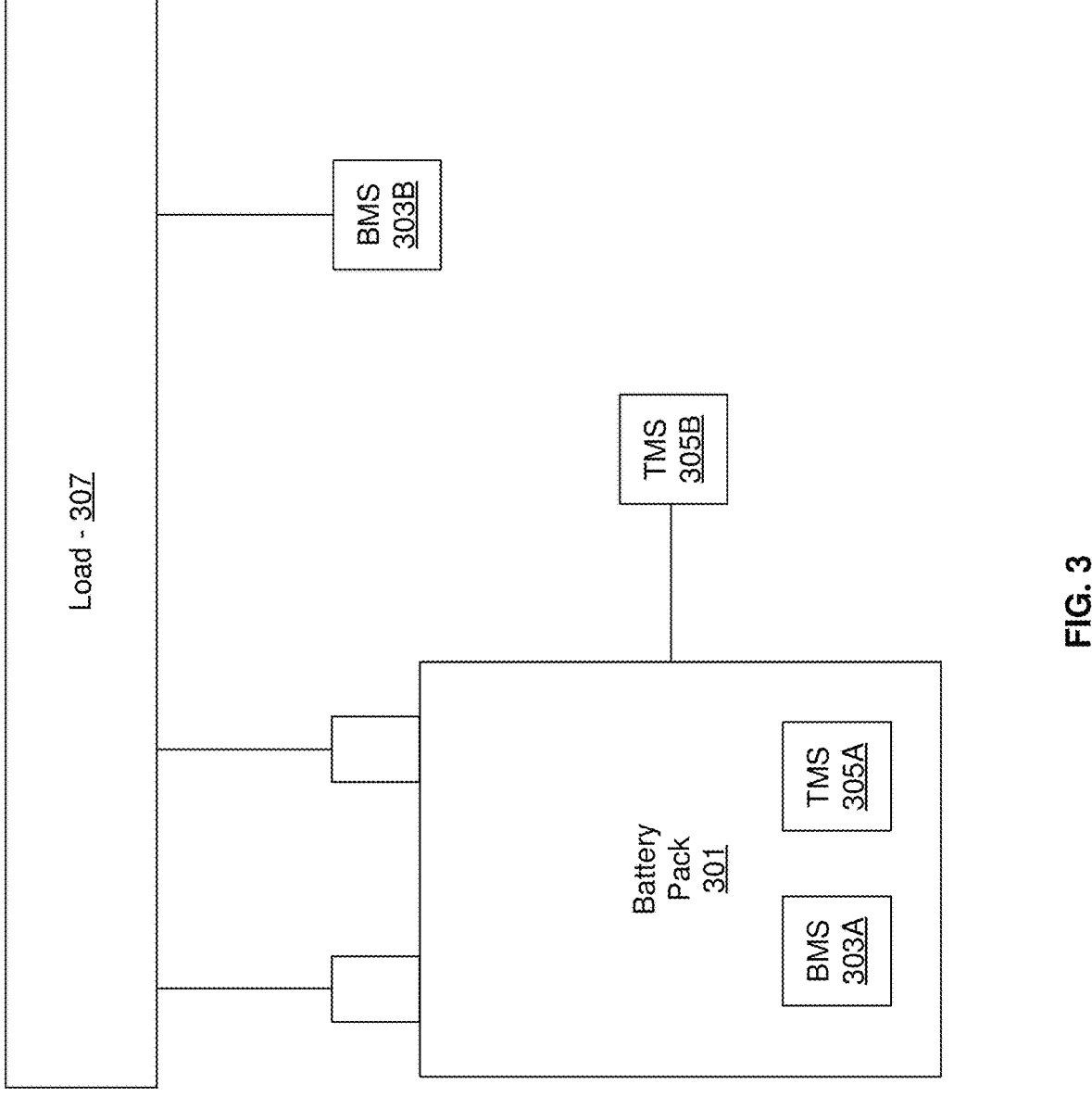
FIG. 3 illustrates a silicon-dominant anode battery pack in use, in accordance with an example embodiment of the disclosure.

FIG. 3 illustrates a silicon-dominant anode battery pack in use, in accordance with an example embodiment of the disclosure. Referring to FIG. 3, there is shown a battery pack 301, which may comprise a plurality of cells in a housing, each cell comprising a silicon-dominant anode, a separator, a cathode, and an electrolyte. The battery pack 301 may also comprise a battery management system 303A, which may comprise one or more sensors for monitoring battery performance, and a controller, for example. The BMS 303A and/or 303B may be operable to measure current, voltage, and temperature of the cells in the battery pack 301.

In addition, the battery pack 301 may comprise a thermal management system (TMS) 305 for measuring and controlling the temperature of the battery pack 301. This is especially important in instances where the battery pack 301 is to be used in harsh thermal environments, such as in an electric vehicle, for example. The TMS 305A may be internal to the battery pack 301, or may be at least partially external to the pack, as indicated by TMS 305B. Example TMS technologies comprise air cooling, liquid cooling, direct refrigerant cooling, and thermo-electric cooling, where each of these systems may also be used for heating the cells in the battery pack 301. The TMS 305A and/or 305B may monitor the temperature of cells in the battery pack 301, and activate cooling or heating processes to ensure a desired temperature of operation for the cells, where cells exhibit the reduced capacity and cycle life when allowed to get too cold or too hot.

In another example, the BMS may be located externally to the battery pack 301, such as the BMS 303B. An example of such a configuration with an external BMS is an electric vehicle where the control system of the vehicle includes the BMS 303B. Either, or both, of the BMSs 303A and 303B may monitor the battery pack 301 during operation, configuring charge and discharge rates, and determine if one or more cells are failing. There is also shown a load 307, which may comprise any electrical system that utilizes the battery pack 301, such as electric motors and control electronics in an electric vehicle, for example.

The cells in the battery pack 301 may be charged and discharged at various rates, where the charge and discharge rates are governed by C-rates. The capacity of a battery is commonly rated at 1 C, meaning that a fully charged battery rated at 1 Ah should provide 1A for one hour. The same battery discharging at 0.5 C should provide 500 mA for two hours, and at 2 C it delivers 2A for 30 minutes. The cells may then be charged at a desired C-rate. For example, cells may be charged at 0.5 C and then tapered to a slower charge rate to finish the charge cycle, at C/20, for example. Accordingly, the BMS 303A/303B may control the voltage at which the battery pack 301 stops during discharge and configure the voltage and current used to charge the battery pack 301.

During normal cycling in various conditions/voltage windows, cells may lose capacity. Some of the capacity loss in Si-dominant cells may be due to lithium trapped deep inside the anode, such as deep inside each silicon particle, or deep inside pyrolytic carbon, for example. By doing a deep discharge, that part of capacity loss can be reversed and put back into the system. In addition, the temperature during discharge may impact the extraction of lithium from the silicon-containing electrode, where an increased temperature may increase the capture probability. Thus, by doing a deep discharge at a configured temperature periodically, cell capacity and cycle life may be improved.

In an example scenario, the deep discharge voltage may utilize a cutoff voltage lower than 2.5, lower than 2V, lower than 1.5V, or lower than 1V. Similarly, the discharge rate may be configured, such as at C/20 or lower, either in constant current (CC) or a CC/constant voltage (CV) taper. The temperature during the deep discharge may be configured to extract deep lithium, to accelerate kinetics, such as at 30° C. or 40° C. or higher. This process may be repeated at regular intervals to continue recovering trapped lithium, thereby improving cycle capacity.

Figure 4:
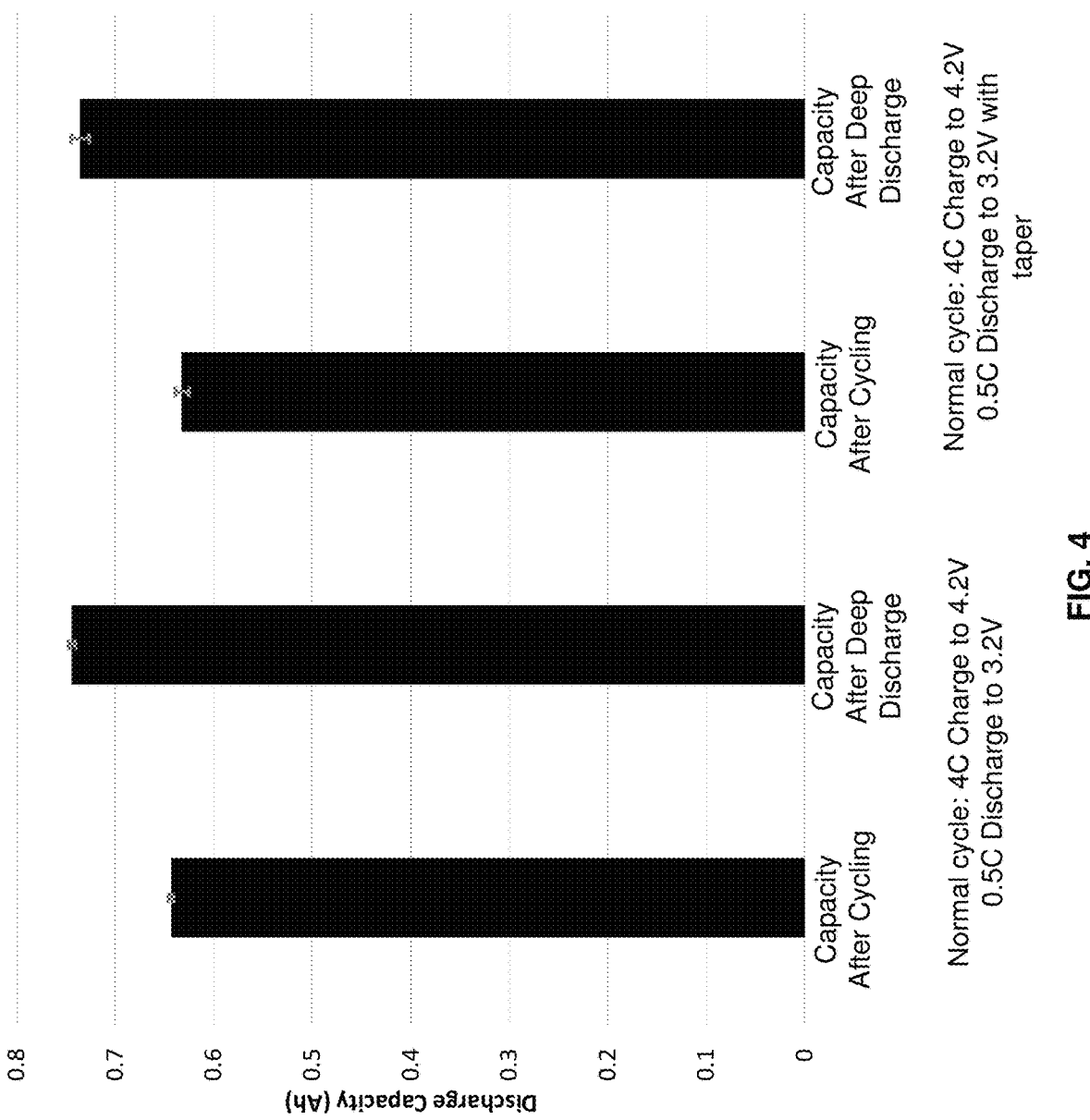
FIG. 4 illustrates discharge capacity for cells before and after a deep discharge, in accordance with an example embodiment of the disclosure.

FIG. 4 illustrates discharge capacity for cells before and after a deep discharge, in accordance with an example embodiment of the disclosure. Referring to FIG. 4, there is shown a plot of discharge capacity for cells after normal cycling and also after a deep discharge. Two voltage windows are shown in this example. The first group being a 4C charge to 4.2V with a C/20 taper in a CC/CV process with a 0.5 C discharge to 3.2V. Every 50 cycles a capacity check may be performed by cycling with a C/3 charge to 4.2V with a C/20 taper and a C/20 discharge to 3.2V. The second group comprises a 4C charge to 4.2V with a C/20 taper in a CC/CV process with a 0.5 C discharge to 3.27 V with a C/20 taper in a CC/CV process. In the C/20 process, once the cell reaches 3.27 V, the discharge continues as current drops while maintaining 3.27 V. Once the current reaches C/20, then the discharge is complete. The discharge capacity from C/2 to 3.2V, and C/2 to 3.27V with C/20 taper may be substantially similar. Every 50 cycles a capacity check may be performed by cycling at C/3 to 4.2V with a C/20 taper and a C/20 discharge to 3.2V.

The results labeled "Capacity After Cycling" represent cells from these two groups after 501 cycles, the 501st cycle being a capacity check, where the first group shows an average of ~0.65 Ah and the second group shows slightly less at ~0.63 Ah.

After normal cycling of 501 cycles, for example, the cells may be deep discharged using three different conditions, where each group of cells are subjected to each of the three deep discharge conditions. In this case, the conditions comprise: 1) after charging, discharge to 2V with C/5 taper at room temperature; 2) after charging, discharge to 2V with C/5 taper at 45° C.; and 3) after charging, discharge to 1V with C/20 taper at 45° C. The results show that both cycle voltage groups recover ~16% capacity after deep discharge.

After deep discharge, the first group of cells in the left two bars in the chart show increased capacity in both capacity check cycle (3%) and normal cycle (6%). The percentage of capacity increase is different because of the polarization of the cell. After deep discharge, the second group in the right two bars shows increased capacity in both capacity check cycle (5%) and normal cycle (5%). The percentage of capacity increase is the same in this example because there is no, or very little, polarization with this specific testing protocol.

Figure 5:
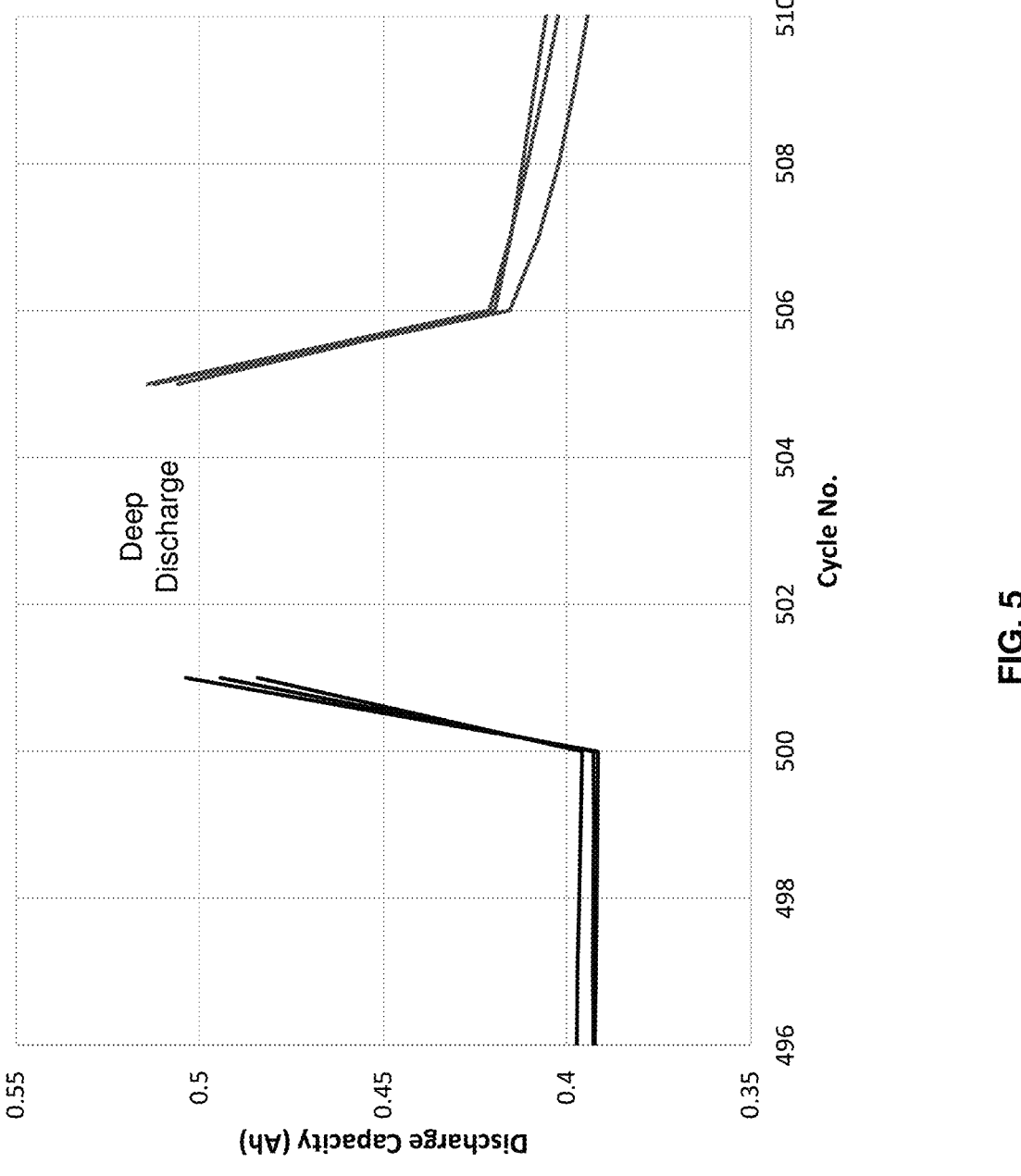
FIG. 5 illustrates cell discharge capacity before and after a deep discharge process for cells in a first group, in accordance with an example embodiment of the disclosure.

FIG. 5 illustrates cell discharge capacity before and after a deep discharge process for cells in a first group, in accordance with an example embodiment of the disclosure. Referring to FIG. 5, the discharge capacity of silicon-dominant anode cells is shown versus cycle number, where regular cycles occur up to cycle 500 where cycle 501 comprises a capacity check with a C/3 charge to 4.2V with a C/20 taper and a C/20 discharge to 3.2V. The capacity check may be followed by the three deep discharge cycles described above comprising 1) after charging, discharge to 2V with C/5 taper at room temperature; 2) after charging, discharge to 2V with C/5 taper at 45° C.; and 3) after charging, discharge to 1V with C/20 taper at 45° C., corresponding to cycles 502-504, and cycle 505 comprises the first regular cycle after the deep discharge. As can be seen by the plot lines, the capacity is significantly improved, where the total capacity between 4.2V and 3.2V shows a 3% increase and the cycling capacity between 4.2V and 3.2 V shows a 6% increase.

Figure 6:
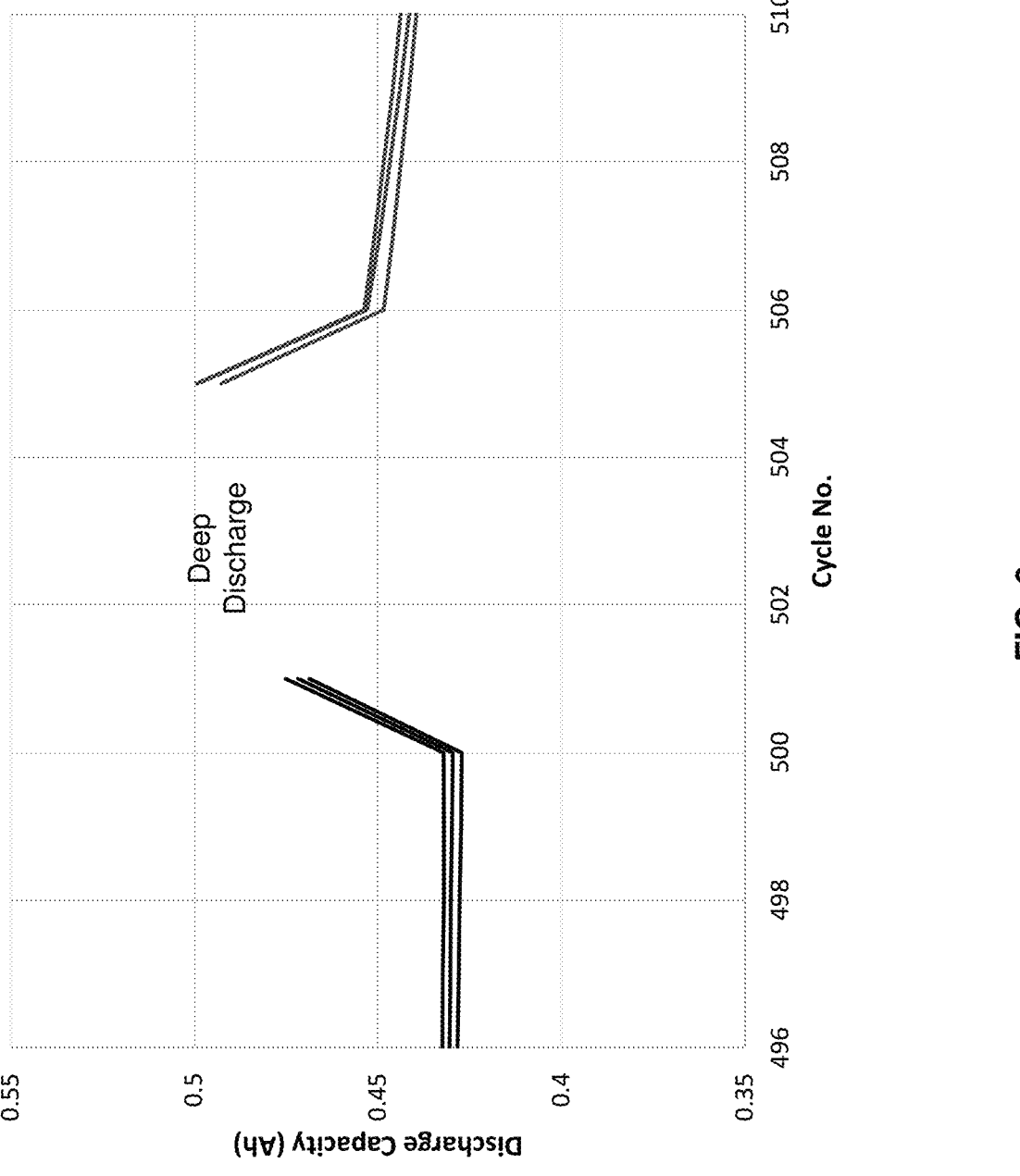
FIG. 6 illustrates cell discharge capacity before and after a deep discharge process for cells in a second group, in accordance with an example embodiment of the disclosure.

FIG. 6 illustrates cell discharge capacity before and after a deep discharge process for cells in a second group, in accordance with an example embodiment of the disclosure. Referring to FIG. 6, the discharge capacity of silicon-dominant anode cells is shown versus cycle number, where regular cycles occur up to cycle 500 where cycle 501 comprises a capacity check with a C/3 charge to 4.2 V with a C/20 taper and a C/20 discharge to 3.27 V. For these cells, the cycles comprise a 4C charge to 4.2V with a C/20 taper in a CC/CV process with a 0.5 C discharge to 3.27 V with a C/20 taper in a CC/CV process. In the C/20 process, once the cell reaches 3.27 V, the discharge continues as current drops while maintaining 3.27 V. Once the current reaches C/20, then the discharge is complete. Every 50 cycles a capacity check may be performed by cycling at C/3 to 4.2 V with a C/20 taper and a C/20 discharge to 3.2 V.

The capacity check may be followed by the three deep discharge cycles described above comprising 1) after charging, discharge to 2V with C/5 taper at room temperature; 2) after charging, discharge to 2V with C/5 taper at 45° C.; and 3) after charging, discharge to 1V with C/20 taper at 45° C., corresponding to cycles 502-504, and cycle 505 comprises the first regular cycle after the deep discharge. As can be seen by the plot lines, the capacity is significantly improved, where the total capacity between 4.2V and 3.27 V shows a 5% increase and the cycling capacity between 4.2 V and 3.27 V shows a 5% increase.

Figure 7:
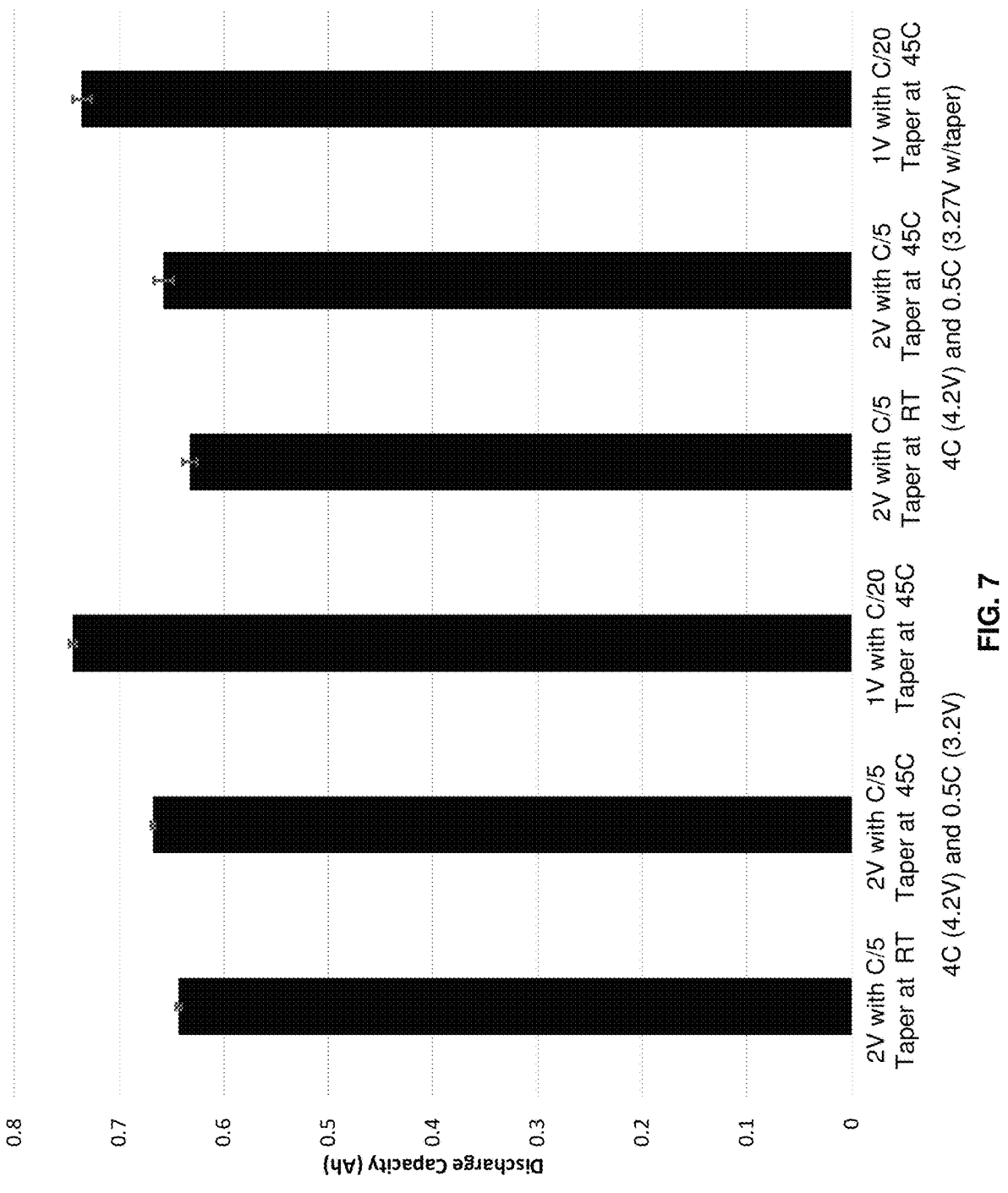
FIG. 7 illustrates discharge capacity for cells before and after a deep discharge with different temperatures, in accordance with an example embodiment of the disclosure.

FIG. 7 illustrates discharge capacity for cells before and after a deep discharge with different temperatures, in accordance with an example embodiment of the disclosure. The plot shows the first and second group cells described above, but with results after each different deep discharge cycle, the discharge cycles again being 1) after charging, discharge to 2V with C/5 taper at room temperature; 2) after charging, discharge to 2V with C/5 taper at 45° C.; and 3) after charging, discharge to 1V with C/20 taper at 45° C. As can be seen in the plot, the higher temperature deep discharges result in higher discharge capacity, and the C/20 discharge at 45° C. being the highest, indicating the increased lithium extraction at higher temperature.

Figure 8:
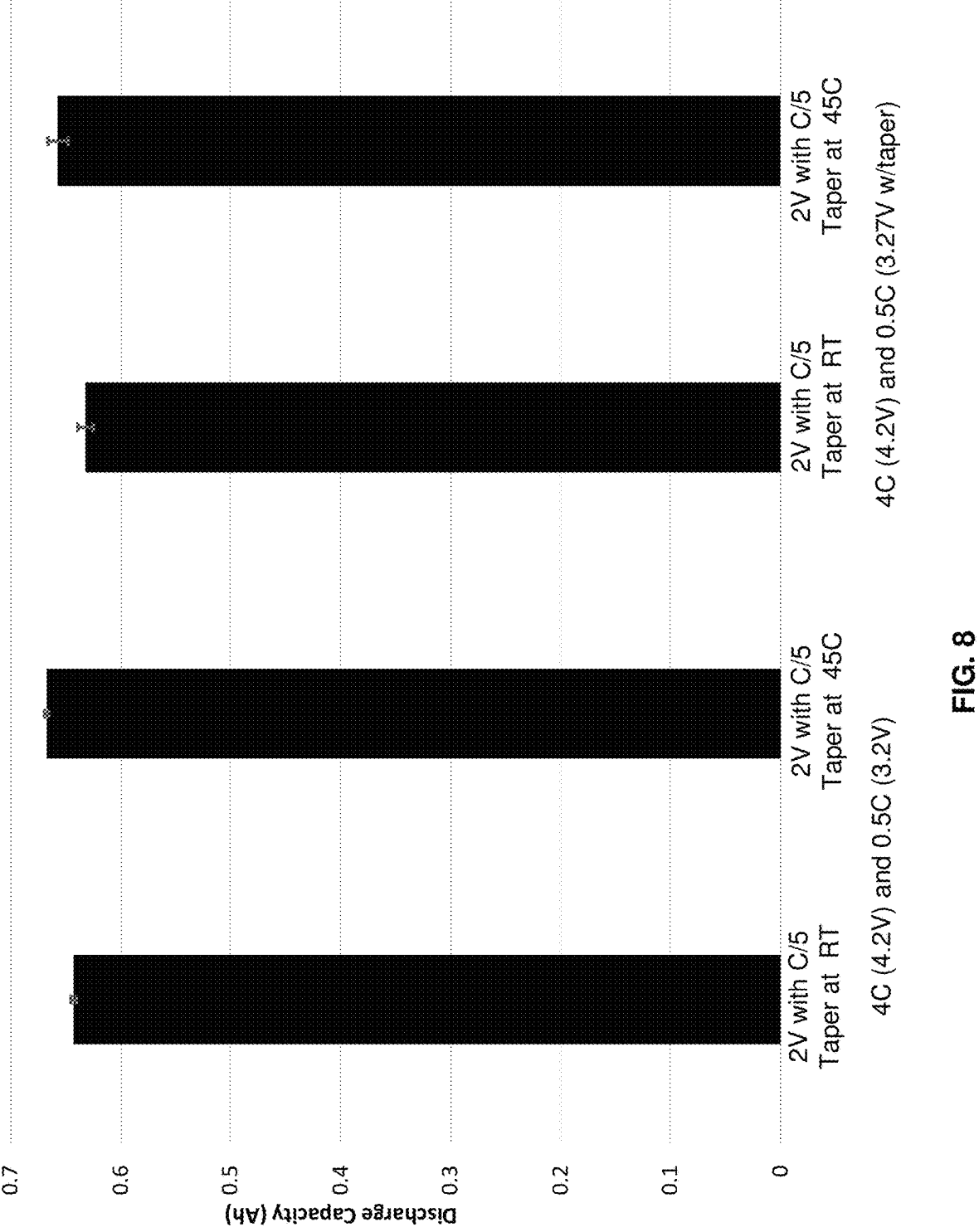
FIG. 8 illustrates discharge capacity for cells before and after a deep discharge with different temperatures but the same discharge conditions, in accordance with an example embodiment of the disclosure.

FIG. 8 illustrates discharge capacity for cells before and after a deep discharge with different temperatures but the same discharge conditions, in accordance with an example embodiment of the disclosure. This plot shows the results where only the deep discharge temperature is changed for each pair of bars, the left two groups of cells being 4C charge to 4.2 V and 0.5 C discharge to 3.2 V and the right two groups being 4C charge to 4.2 V and 0.5 C discharge to 3.27 C with a taper. The deep discharge cycles for these groups being 1) after charging, discharge to 2V with C/5 taper at room temperature; 2) after charging, discharge to 2V with C/5 taper at 45° C.

From the plot, it is again evident that the discharge capacity recovers more with higher temperature where 45 C deep discharge results in better lithium extraction, and thus higher discharge capacity recovered.

In an example embodiment of the disclosure, a method and system is described for periodic deep discharge to extract lithium in silicon-dominant anodes, and may include providing a cell comprising a cathode, a separator, and a silicon-dominant anode; charging and discharging the cell through a plurality of cycles or through regular use where the usage is equivalent to a plurality of cycles; and, following the plurality of cycles or equivalent use, performing one or more deep discharge cycles, where each deep discharge cycle comprises a cutoff voltage below a normal operating voltage range of the cell and then resuming operation where the cell is allowed to discharge to a shallower depth of discharge.

The one or more deep discharge cycles may comprise a C/10 or lower discharge current or a C/20 or lower discharge current. The one or more deep discharge cycles may comprise a cutoff voltage of 3.2 V or less, a cutoff voltage of 2.5 V or less, a cutoff voltage of 1.5 V or less, or a cutoff voltage of 1 V or less. The cell may be configured at a temperature of 30° C., or at a temperature of 40° C. or higher, during the one or more deep discharge cycles. The one or more deep discharge cycles may be configured using a battery management system. The battery management system may be integrated with the cell and/or may be external to the cell. The one or more deep discharge cycles may be performed periodically. The one or more deep discharge cycles may comprise a taper where the cell is held at the lower cutoff voltage until the discharge current decreases to C/20.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method of configuring battery performance, the method comprising:
   providing a cell comprising a cathode, a separator, and a silicon-dominant anode;
   charging and discharging the cell through a plurality of cycles or through regular use that is equivalent to a plurality of cycles; and
   following the plurality of cycles or equivalent use, performing a capacity check cycle, wherein the capacity check cycle comprises one or both of charging at a charge rate below a normal charge rate, and discharging at a discharge rate below a normal discharge rate; and
   based on the capacity check cycle, performing one or more deep discharge cycles,
   wherein each of the one or more deep discharge cycles comprises using a discharge cutoff voltage outside of a normal operating voltage range of the cell and then resuming operation,
   wherein the cell is discharged during at least one of the one or more deep discharge cycles at a first discharge rate that is different from a second discharge rate used during normal operations,
   wherein the capacity check cycle is different from each of the one or more deep discharge cycles with respect to at least a minimum discharge cutoff voltage, and
   wherein at least one of the one or more deep discharge cycles comprises a C/10 or lower discharge current.

2. The method of claim 1, wherein at least one of the one or more deep discharge cycles comprises a C/20 or lower discharge current.

3. The method according to claim 1, wherein at least one of the one or more deep discharge cycles comprises a cutoff voltage of 3.2 V or less.

4. The method according to claim 1, wherein at least one of the one or more deep discharge cycles comprises a cutoff voltage of 2.5 V or less.

5. The method according to claim 1, wherein at least one of the one or more deep discharge cycles comprises a cutoff voltage of 1.5 V or less.

6. The method according to claim 1, wherein at least one of the one or more deep discharge cycles comprises a cutoff voltage of 1 V or less.

7. The method of claim 1, comprising configuring the cell at a temperature of 30° C. or higher during at least one of the one or more deep discharge cycles.

8. The method of claim 1, comprising configuring the cell at a temperature of 40° C. or higher during at least one of the one or more deep discharge cycles.

9. The method of claim 1, comprising configuring at least one of the deep discharge cycle using a battery management system.

10. The method of claim 9, wherein the battery management system is integrated with the cell.

11. The method of claim 9, wherein the battery management system is external to the cell.

12. The method of claim 1, comprising performing the one or more deep discharge cycles periodically.

13. A method of configuring battery performance, the method comprising:
   providing a cell comprising a cathode, a separator, and a silicon-dominant anode;
   charging and discharging the cell through a plurality of cycles or through regular use where the usage is equivalent to a plurality of cycles; and
   following the plurality of cycles or equivalent use, performing a capacity check cycle, wherein the capacity check cycle comprises one or both of charging at a charge rate below a normal charge rate, and discharging at a discharge rate below a normal discharge rate; and
   based on the capacity check cycle, performing one or more deep discharge cycles,
   wherein each of the one or more deep discharge cycles comprises a discharge cutoff voltage outside of a normal operating voltage range of the cell and a cell temperature configured above room temperature and then resuming operation where the cell is allowed to discharge to a shallower depth of discharge;
   wherein the cell is discharged during at least one of the one or more deep discharge cycles at a first discharge rate that is different from a second discharge rate used during normal operations; and
   wherein the capacity check cycle is different from each of the one or more deep discharge cycles with respect to at least a minimum discharge cutoff voltage; and
   wherein performing at least one of the one or more deep discharge cycles comprises using a voltage taper after the cell reaches a particular cutoff voltage, and wherein the voltage taper is applied until a current discharged from the cell reaches a pre-determined end of taper C-rate based value.

14. The method of claim 13, wherein performing the at least one of the one or more deep discharge cycles further comprises controlling a temperature of the cell, the controlling comprising setting the temperature to a predetermined value during at least a portion of the voltage taper.

15. A method of configuring battery performance, the method comprising:
   providing a cell comprising a cathode, a separator, and a silicon-dominant anode;
   charging and discharging the cell through a plurality of cycles or through regular use that is equivalent to a plurality of cycles; and
   following the plurality of cycles or equivalent use, performing a capacity check cycle, wherein the capacity check cycle comprises one or both of charging at a charge rate below a normal charge rate, and discharging at a discharge rate below a normal discharge rate; and
   based on the capacity check cycle, performing one or more deep discharge cycles,
   wherein each of the one or more deep discharge cycles comprises using a discharge cutoff voltage outside of a normal operating voltage range of the cell and then resuming operation,
   wherein the cell is discharged during at least one of the one or more deep discharge cycles at a first discharge rate that is different from a second discharge rate used during normal operations,
   wherein the capacity check cycle is different from each of the one or more deep discharge cycles with respect to at least a minimum discharge cutoff voltage, and
   wherein at least one of the one or more deep discharge cycle comprises a taper where the cell is held at the discharge cutoff voltage until the discharge current decreases to C/20.

16. The method according to claim 15, wherein at least one of the one or more deep discharge cycles comprises a C/20 or lower discharge current.

17. The method according to claim 15, wherein at least one of the one or more deep discharge cycles comprises a cutoff voltage of 3.2 V or less.

18. The method according to claim 15, wherein at least one of the one or more deep discharge cycles comprises a cutoff voltage of 2.5 V or less.

19. The method according to claim 15, wherein at least one of the one or more deep discharge cycles comprises a cutoff voltage of 1.5 V or less.

20. The method according to claim 15, wherein at least one of the one or more deep discharge cycles comprises a cutoff voltage of 1 V or less.

21. The method of claim 15, comprising configuring the cell at a temperature of 30° C. or higher during at least one of the one or more deep discharge cycles.

22. The method of claim 15, comprising configuring the cell at a temperature of 40° C. or higher during at least one of the one or more deep discharge cycles.

23. The method of claim 15, comprising configuring at least one of the deep discharge cycle using a battery management system.

24. The method of claim 23, wherein the battery management system is integrated with the cell.

25. The method of claim 23, wherein the battery management system is external to the cell.

26. The method of claim 15, comprising performing the one or more deep discharge cycles periodically.

27. A method of configuring battery performance, the method comprising:

providing a cell comprising a cathode, a separator, and a silicon-dominant anode;

charging and discharging the cell through a plurality of cycles or through regular use where the usage is equivalent to a plurality of cycles; and following the plurality of cycles or equivalent use, performing a capacity check cycle, wherein the capacity check cycle comprises one or both of charging at a charge rate below a normal charge rate, and discharging at a discharge rate below a normal discharge rate; and based on the capacity check cycle, performing one or more deep discharge cycles, wherein each of the one or more deep discharge cycles comprises a discharge cutoff voltage outside of a normal operating voltage range of the cell and a cell temperature configured above room temperature and then resuming operation where the cell is allowed to discharge to a shallower depth of discharge;

wherein the cell is discharged during at least one of the one or more deep discharge cycles at a first discharge rate that is different from a second discharge rate used during normal operations;

wherein the capacity check cycle is different from each of the one or more deep discharge cycles with respect to at least a minimum discharge cutoff voltage; and wherein performing at least one of the one or more deep discharge cycles comprises using a voltage taper after the cell reaches a particular cutoff voltage, wherein the voltage taper is applied until a current discharged from the cell reaches a pre-determined end of taper C-rate based value, and setting the cell temperature to a predetermined value during at least a portion of the voltage taper.

* * * * *